United States Patent
Bunya et al.

(10) Patent No.: US 11,832,370 B2
(45) Date of Patent: Nov. 28, 2023

(54) TABLE TYPE COOKING APPARATUS

(71) Applicant: Mitsubishi Electric Corporation, Tokyo (JP)

(72) Inventors: Jun Bunya, Tokyo (JP); Ikuro Suga, Tokyo (JP); Hayato Yoshino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 477 days.

(21) Appl. No.: 17/051,824

(22) PCT Filed: Jul. 4, 2018

(86) PCT No.: PCT/JP2018/025347
§ 371 (c)(1),
(2) Date: Oct. 30, 2020

(87) PCT Pub. No.: WO2020/008557
PCT Pub. Date: Jan. 9, 2020

(65) Prior Publication Data
US 2021/0092805 A1 Mar. 25, 2021

(51) Int. Cl.
*H05B 6/12* (2006.01)
*H05B 6/06* (2006.01)

(52) U.S. Cl.
CPC .......... *H05B 6/1209* (2013.01); *H05B 6/065* (2013.01)

(58) Field of Classification Search
CPC ...... H05B 6/062; H05B 6/065; H05B 6/1209; H05B 6/1236; Y02B 40/00; A61K 31/135;
(Continued)

(56) References Cited

U.S. PATENT DOCUMENTS

| | | | |
|---|---|---|---|
| 3,761,668 A | * | 9/1973 | Harnden, Jr. .......... H05B 6/062 219/622 |
| 2016/0118808 A1 | | 4/2016 | Van Wageningen et al. |
| 2017/0023260 A1 | | 1/2017 | Charpentier et al. |

FOREIGN PATENT DOCUMENTS

| | | |
|---|---|---|
| CN | 101449880 A | 6/2009 |
| CN | 105144535 A | 12/2015 |

(Continued)

OTHER PUBLICATIONS

Office Action dated Aug. 3, 2021 issued in corresponding JP Patent Application No. 2020-528596 ( and English translation).

(Continued)

*Primary Examiner* — Quang T Van
(74) *Attorney, Agent, or Firm* — POSZ LAW GROUP, PLC

(57) ABSTRACT

A table type cooking apparatus includes: a heating coil that inductively heats an object; a power transmission coil that transmits power to a power receiving device; a housing that houses the heating coil and the power transmission coil; a top plate provided on an upper surface of the housing; and a leg portion provided on a floor surface to support the housing on a floor surface. The top plate includes: a heating area provided as an area in which the object is inductively heated by the heating coil, a power transmission area provided as an area in which power is transmitted from the power transmission coil to the power receiving device, and a work area including at least an area in which when at least one of the heating coil and the power transmission coil is in a conductive state, a surface potential of a metal object is constant.

12 Claims, 9 Drawing Sheets

(58) Field of Classification Search
CPC .............. A61K 31/325; A61K 31/4184; A61K 31/423; A61K 31/426; A61K 31/44; A61K 31/505; A61P 25/04; A61P 29/00; C07C 211/38; C07C 211/40; C07C 215/08; C07C 217/52; C07C 217/62; C07C 229/10; C07C 229/14; C07C 235/14; C07C 237/04; C07C 2602/38; C07D 213/26; C07D 213/38; C07D 235/14; C07D 239/26; C07D 263/56; C07D 277/22; C07D 277/28; C07D 277/64
USPC ....... 219/624, 618, 620, 621, 622, 625, 626, 219/627, 660, 661, 662, 663, 664, 667, 219/671, 677, 494, 497; 426/237, 241
See application file for complete search history.

(56) References Cited

FOREIGN PATENT DOCUMENTS

| DE | 20 2011 000 639 U1 | 12/2011 | |
|---|---|---|---|
| EP | 3 020 305 A1 | 5/2016 | |
| JP | 2005190696 A * | 7/2005 | |
| JP | 2009-277520 A | 11/2009 | |
| JP | 5029489 B2 | 9/2012 | |
| JP | 2012-187243 A | 10/2012 | |
| JP | 2016-039644 A | 3/2016 | |
| JP | 2016-516392 A | 6/2016 | |
| JP | 2017-059460 A | 3/2017 | |
| JP | 2017-510947 A | 4/2017 | |
| JP | 2017-174531 A | 9/2017 | |
| WO | WO-2012035709 A1 * | 3/2012 | ............ H05B 6/062 |
| WO | 2013/103939 A1 | 7/2013 | |
| WO | 2015/062947 A1 | 5/2015 | |
| WO | 2017/038153 A1 | 3/2017 | |
| WO | 2018/024913 A1 | 2/2018 | |

OTHER PUBLICATIONS

International Search Report of the International Searching Authority dated Sep. 11, 2018 for the corresponding International application No. PCT/JP2018/025347 (and English translation).
Office Action dated Feb. 8, 2022 issued in corresponding JP patent application No. 2020-528596 (and English translation).
Office Action dated May 12, 2022 issued in corresponding CN Patent Application No. 201880094668.3 (and English translation).
Extended European Search Report dated Jun. 2, 2021 issued in corresponding European patent application No. 18925572.2.

* cited by examiner

TABLE TYPE COOKING APPARATUS

CROSS REFERENCE TO RELATED APPLICATION

This application is a U.S. national stage application of PCT/JP2018/025347 filed on Jul. 4, 2018, the contents of which are incorporated herein by reference.

TECHNICAL FIELD

The present disclosure relates to a table type cooking apparatus provided with leg portions that are provided on a floor surface to support a housing.

BACKGROUND ART

In the past, for example, a built-in induction heating cooker has been proposed in which a plurality of induction heating devices are provided below a top plate such that a user can cook in the same posture from either a kitchen side or a living room side (see, for example, Patent Literature 1).

CITATION LIST

Patent Literature

Patent Literature 1: Japanese Unexamined Patent Application Publication No. 2009-277520

SUMMARY OF INVENTION

Technical Problem

In the built-in induction heating cooker described in Patent Literature 1, a main body unit is built into a kitchen with a counter facing a dining area. While cooking with the induction heating cooker provided in the main body unit, a user can use a top surface of the kitchen as a dining table for cooking or eating. However, in the built-in induction heating cooker described in Patent Literature 1, only cooking in which an object to be heated is inductively heated using the induction heating cooker can be done, and the convenience of the cooking is thus low.

The present disclosure is applied to solve above problem, and relates to a table type cooking apparatus that is improved in the convenience of cooking.

Solution to Problem

A table type cooking apparatus according to an embodiment of the present disclosure includes: a heating coil that inductively heats an object to be heated; a power transmission coil that transmits power to a power receiving device; a housing that houses the heating coil and the power transmission coil; a top plate provided on an upper surface of the housing; and a leg portion that is provided on a floor surface to support the housing. The top plate includes: a heating area provided as an area in which the object is inductively heated by the heating coil, a power transmission area provided as an area in which power is transmitted from the power transmission coil to the power receiving device, and a work area including at least an area in which when at least one of the heating coil and the power transmission coil is in a conductive state, a surface potential of a metal object is constant.

Advantageous Effects of Invention

According to the embodiment of the present disclosure, the top plate includes the heating area, the power transmission area, and the work area. Therefore, induction heating cooking at the heating area, transmission of power to a power receiving device at the power transmission area, and a cooking work at the work area can be simultaneously performed on the upper surface of the top plate. As a result, the convenience of cooking can be improved.

DESCRIPTION OF EMBODIMENTS

Embodiment 1

(Configuration)

Figure 1:
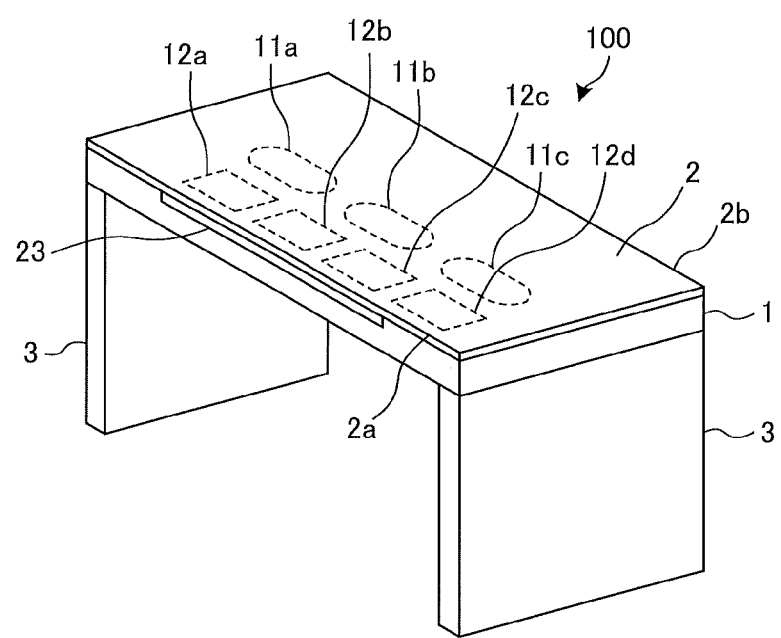
FIG. 1 is a perspective view illustrating a configuration of a table type cooking apparatus according to Embodiment 1 of the present disclosure.

FIG. 1 is a perspective view illustrating a configuration of a table type cooking apparatus according to Embodiment 1 of the present disclosure.

As illustrated in FIG. 1, a table type cooking apparatus 100 includes a housing 1, a top plate 2 provided on an upper surface of the housing 1, and leg portions 3 that support the housing on a floor surface. The entire top plate 2 is made of heat resisting reinforced glass, crystallized glass or a similar material. The top plate 2 and an outer periphery of an upper opening of the housing 1 are water-tightly fixed to each other, with a rubber packing or a sealing material interposed between the top pate 2 and the outer periphery of the upper opening. On an upper surface of the top plate 2, an object 200 to be heated, such as a pot or a frying pan, is placed (see FIG. 2). Also, on the upper surface of the top plate 2, a power receiving device 300 to which power is transmitted from the table type cooking apparatus 100 is placed (see FIG. 2).

The top plate 2 is formed in a rectangular shape as viewed in plan view, and has a first side 2a and a second side 2b on opposite sides. The leg portions 3 support the housing 1, with a space provided between the housing 1 and the floor surface. For example, the leg portions 3 support the housing 1 such that the space between the housing 1 and the floor surface is located under at least one of the first side 2a and the second side 2b of the top plate 2. On part of the floor surface that is located under at least one of the first side 2a and the second side 2b of the top plate 2, a chair or a similar article of furniture, on which a user uses, is placed. That is, the table type cooking apparatus 100 is used as a table.

In the housing 1, a heating coil 11a, a heating coil 11b and a heating coil 11c are housed. The heating coils 11a to 11c each are formed by winding conductive wire made of metal and covered with an insulation film. It should be noted that the material of the conductive wire is an arbitrary metal such as copper or aluminum. In the following description, the heating coils 11a to 11c are referred to as heating coils 11 in the case where the heating coils 11a to 11c do not need to be distinguished from each other. It should be noted that the number of the heating coils 11 is not limited to three, and may be one or more.

Each of the heating coils 11 produces a high-frequency magnetic field when being supplied with a high-frequency current from a drive circuit 21, which will be described later, with a high-frequency current. As a result, the table type cooking apparatus 100 inductively heats the object 200 placed on the top plate 2. It should be noted that under the heating coils 11, magnetic materials (not illustrated) such as ferrites are provided. Because of provision of the magnetic materials, the leak of a magnetic flux in a downward direction from the heating coils 11 is reduced.

In the housing 1, a power transmission coil 12a, a power transmission coil 12b, a power transmission coil 12c, and a power transmission coil 12d are housed. The power transmission coils 12a to 12d are each formed by winding conductive wire made of metal and covered with an insulation film. It should be noted that the conductive wire is made of an arbitrary metal such as copper or aluminum. The power transmission coils 12a to 12d may be printing patterns made of copper foil. In the following description, the power transmission coils 12a to 12d are referred to as the power transmission coils 12 in the case where the power transmission coils 12a to 12d do not need to be distinguished from each other. It should be noted that the number of the power transmission coils 12 is not limited to four, and may be one or more.

Each of the power transmission coils 12 produces a high-frequency magnetic field when being supplied with a high-frequency current from a power transmission circuit 22, which will be described later. As a result, the table type cooking apparatus 100 operates as a non-contact transmitter that transmits power to the power receiving device 300 placed on the top plate 2.

At a side surface of the housing 1, an operation display unit 23 is provided. The operation display unit 23 is, for example, a touch screen in which touch switches are arranged on an upper surface of an LCD. It should be noted that the LCD is an abbreviation for liquid crystal device. The operation display unit 23 has a function of an operation unit that allows a user to input an operation instruction. The operation display unit 23 also has a function of a display unit that displays information such as an operation state of the table type cooking apparatus 100 and the contents of the operation instruction input by the user.

Figure 2:
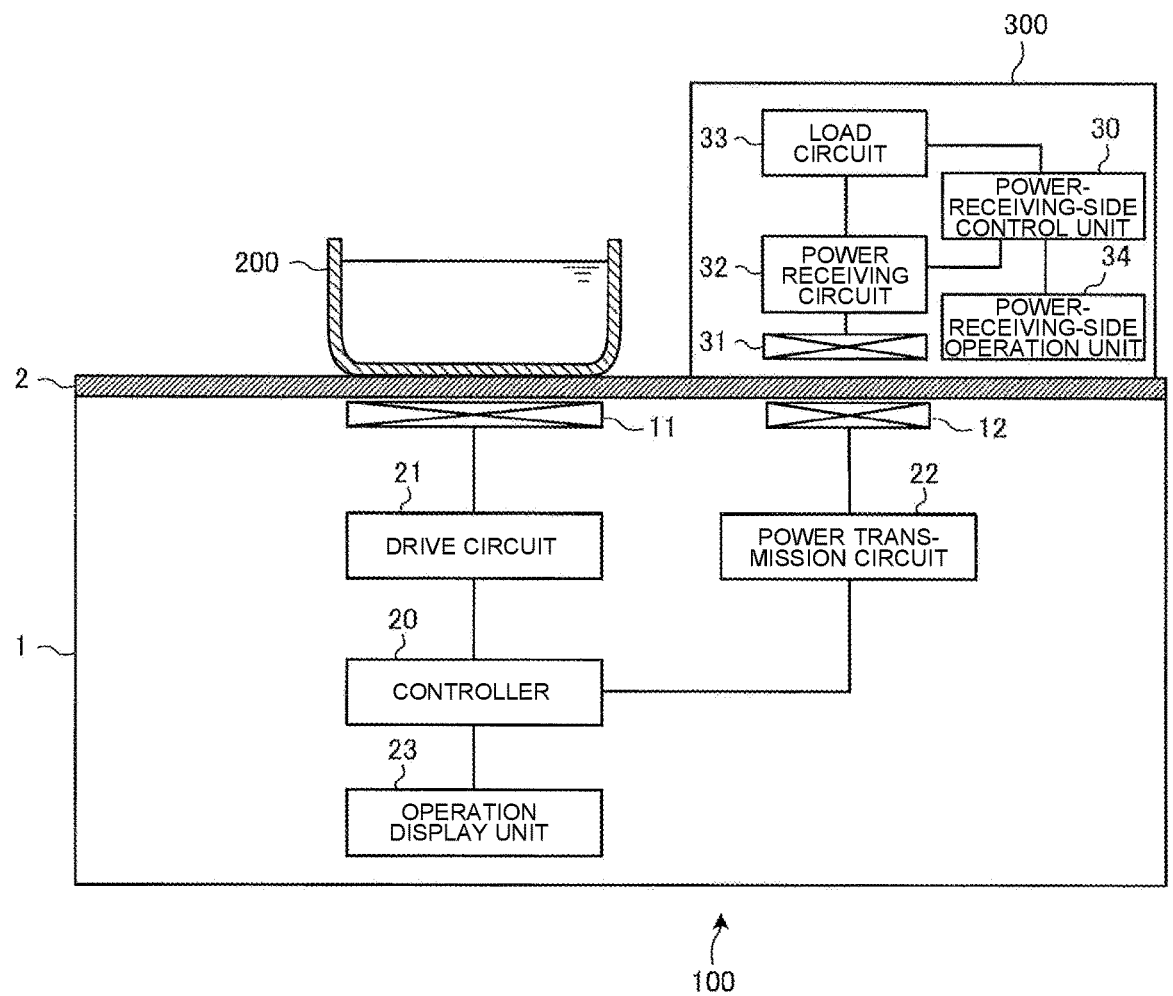
FIG. 2 is a block diagram illustrating a configuration of the table type cooking apparatus according to Embodiment 1 of the present disclosure.

FIG. 2 is a block diagram illustrating a configuration of the table type cooking apparatus according to Embodiment 1 of the present disclosure. FIG. 2 illustrates a state where the object 200 and the power receiving device 300 are placed on the top plate 2 of the table type cooking apparatus 100.

As illustrated in FIG. 2, in the housing 1 of the table type cooking apparatus 100, the heating coils 11, the power transmission coils 12, a controller 20, the drive circuit 21, the power transmission circuit 22, and the operation display unit 23 are provided.

The drive circuit 21 is connected to an alternating-current (AC) power source via a rectifier circuit. The drive circuit 21 converts a direct-current (DC) power input from the rectifier circuit into an AC power having a high-frequency of, for example, approximately 20 to 100 kHz, and outputs the power to the heating coils 11.

The power transmission circuit 22 is connected to an AC power source via a rectifier circuit. The power transmission circuit 22 converts a DC power input from the rectifier circuit into a high-frequency AC power depending on a power transmission system, and outputs the power to the power transmission coil 12.

The controller 20 is a microcomputer, a DSP or other similar devices. It should be noted that the DSP is an abbreviation for digital signal processor. The controller 20 controls the drive circuit 21 and the power transmission circuit 22 based on the contents of the operation instruction from the operation display unit 23. The controller 20 also causes the operation display unit 23 to display information based on the operation state.

The power receiving device 300 is a heating cooker such as a fryer, a steam cooker, a roaster or a toaster. In addition, the power receiving device 300 is a cooking device for, for example, precooking food, such as a blender, a stand mixer, a grinder, a hand mixer or a food processor.

Also, the power receiving device 300 is an arbitrary electric apparatus such as a remote control unit or a smartphone. In the case where the power receiving device 300 is a remote control unit, the table type cooking apparatus 100 is provided with a communication device that communicates with the remote control unit. The controller 20 receives an operation signal transmitted from the remote control unit via the communication device, and controls the drive circuit 21. In addition, the controller 20 transmits information on the operation state or other information to the remote control unit via the communication device.

The power receiving device 300 includes a power-receiving-side control unit 30, a power receiving coil 31, a power receiving circuit 32, a load circuit 33 and a power-receiving-side operation unit 34.

The power receiving coil 31 is formed by winding conductive wire made of metal and covered with an insulation film. It should be noted that the conductive wire is made of an arbitrary metal such as copper or aluminum. The power receiving coil 31 may be a printing pattern made of copper foil. For example, the power receiving coil 31 has substantially the same shape as the power transmission coil 12 of the table type cooking apparatus 100 as viewed in plan view. When the power receiving device 300 is placed on the top plate 2, the power receiving coil 31 receives power from the power transmission coil 12 by electromagnetic induction or electromagnetic resonance.

The power receiving circuit 32 rectifies and smooths the power received by the power receiving coil 31. The load circuit 33 is connected to an output side of the power receiving circuit 32, and operates as the power receiving device 300 when being supplied with power from the power receiving circuit 32.

The power-receiving-side control unit 30 is a microcomputer, a DSP or other similar devices. The power-receiving-side control unit 30 controls the operation of the entire power receiving device 300 including the power receiving circuit 32 and the load circuit 33. The power-receiving-side operation unit 34 performs, for example, operations of starting and stopping the supply of power to the power receiving device 300, and inputs, for example, a set value for power to be supplied to the load circuit 33.

The power receiving device 300 is placed on the top plate 2 of the table type cooking apparatus 100, and receives power in a non-contact manner from the table type cooking apparatus 100. To be more specific, when being supplied with a high-frequency power from the power transmission circuit 22, the power transmission coil 12, which is provided under the top plate 2 of the table type cooking apparatus 100, produces a high-frequency magnetic field. The high-frequency magnetic field is received by the power receiving coil 31, which is provided in the power receiving device 300, and power is supplied to the load circuit 33.

It should be noted that in the case where the load circuit 33 is a heater load, the power-receiving-side control unit 30 of the power receiving device 300 controls the power receiving circuit 32 to supply AC power received by the power receiving coil 31 to the load circuit 33 as it is. Furthermore, for example, in the case where the load circuit 33 is a motor load, the power-receiving-side control unit 30 controls the power receiving circuit 32 to rectify and smooth power received by the power receiving coil 31, to convert the power into an arbitrary AC power using an inverter circuit or a similar device, and to supply the AC power to the load circuit 33. That is, in the case where the load circuit 33 is a motor load, the load circuit 33 is driven at a variable speed. It should be noted that a rectified and smoothed DC power may be applied to the heater load.

It should be noted that the power transmission from the power transmission coil 12 to the power receiving coil 31 may be performed by electromagnetic induction or electromagnetic resonance. In the power transmission by electromagnetic resonance, when the distance between the power transmission coil 12 and the power receiving coil 31 is set long, the amount of reduction of a power reception efficiency is small, compared with the power transmission by electromagnetic induction. That is, in the power transmission by electromagnetic resonance, power can be transmitted by a long distance. This is an advantage. By contrast, in the power transmission by electromagnetic induction, although the distance by which power can be transmitted is short, a high power transmission can be achieved, as compared with the power transmission by electromagnetic resonance. It should be noted that the power reception efficiency in power transmission is the ratio of the power received by the power receiving coil 31 to the power supplied to the power transmission coil 12.

In the power transmission by electromagnetic induction, a high-frequency current having a frequency of several tens of kHz is supplied from the power transmission circuit 22 to the power transmission coil 12. It should be noted that in the power transmission by electromagnetic induction, it is preferable that magnetic materials such as ferrites be provided below the power transmission coil 12 and above the power receiving coil 31.

In the power transmission by electromagnetic resonance, a high-frequency current having a frequency of several MHz is supplied from the power transmission circuit 22 to the power transmission coil 12. For example, the frequency of a high-frequency current is 6.78 MHz or 13.56 MHz. It should be noted that in the power transmission by electromagnetic resonance, it is not necessary that magnetic materials such as ferrites are provided below the power transmission coil 12 and above the power receiving coil 31, and the apparatus and device can be made smaller. It should be noted that in the power transmission by electromagnetic resonance, it is preferable that a wide-band gap semiconductor made of a silicon carbide based or gallium nitride based material be provided as a switching element of the power transmission circuit 22. By using a wide-band gap semiconductor as the switching element, the conduction loss of the switching element can be reduced. In addition, by using the wide-band gap semiconductor as the switching element, the heat resistance of the power transmission circuit 22 is satisfactory even when the frequency of the switching element is high. Therefore, heat radiating fins of the power transmission circuit 22 can be made smaller, and the power transmission circuit 22 can be made smaller and formed at a lower cost.

Figure 3:
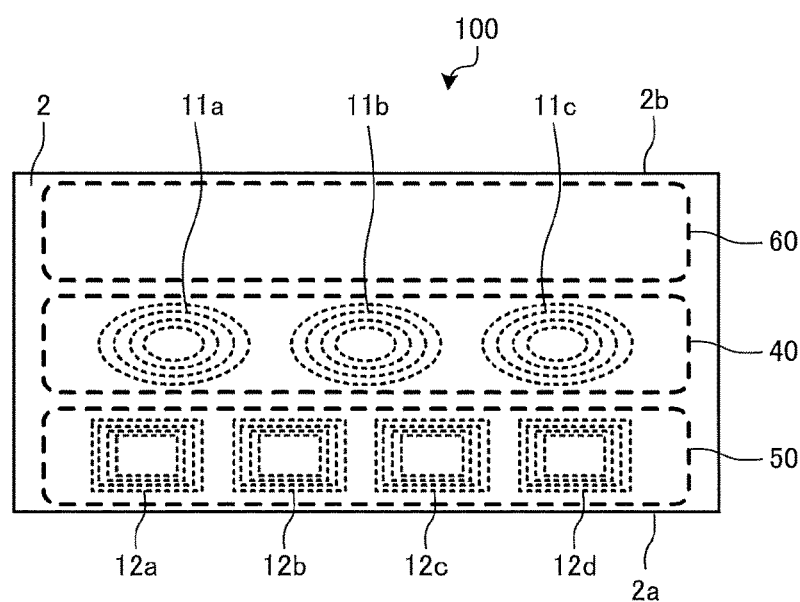
FIG. 3 is a plan view illustrating the table type cooking apparatus according to Embodiment 1 of the present disclosure.

FIG. 3 is a plan view illustrating the table type cooking apparatus according to Embodiment 1 of the present disclosure.

As illustrated in FIG. 3, the heating coils 11a to 11c are provided between the first side 2a and the second side 2b of the top plate 2 and arranged along the first side 2a and the second side 2b as viewed in plan view. The power transmission coils 12a to 12d are provided between the first side 2a of the top plate 2 and the heating coils 11a to 11c and arranged along the first side 2a as viewed in plan view.

The top plate 2 are divided into a heating area 40, a power transmission area 50, and a work area 60. Under the heating area 40, the heating coils 11 are provided. Under the power transmission area 50, the power transmission coils 12 are provided. Under the work area 60, neither the heating coils 11 nor the power transmission coils 12 are provided.

The heating area 40 is an area in which the object 200 placed on the top plate 2 is inductively heated by the heating coil or coils 11. The power transmission area 50 is an area in which power is transmitted from the power transmission coil 12 to the power receiving device 300 placed on the top plate 2.

The work area 60 is located between the second side 2b and the heating coils 11. In addition, in the work area 60, the object 200 is not inductively heated by the heating coil 11, and power is not transmitted from the power transmission coil 12 to the power receiving device 300. That is, the work area 60 is an area in which when at least one of the heating coil 11 and the power transmission coil 12 is in a conductive state, a surface potential of the object 200, the power receiving coil 31 or a metal object, such as a spoon, which is placed on the top plate 2, is constant. It should be noted that it suffices that the work area 60 includes at least an area in which when at least one of a heating coil 11 and a power transmission coil 12 is in a conductive state, a surface potential of a metal object placed on the top plate 2 is constant.

(Operations)

Next, operations of the table type cooking apparatus 100 according to Embodiment 1 will be described.

Figure 4:
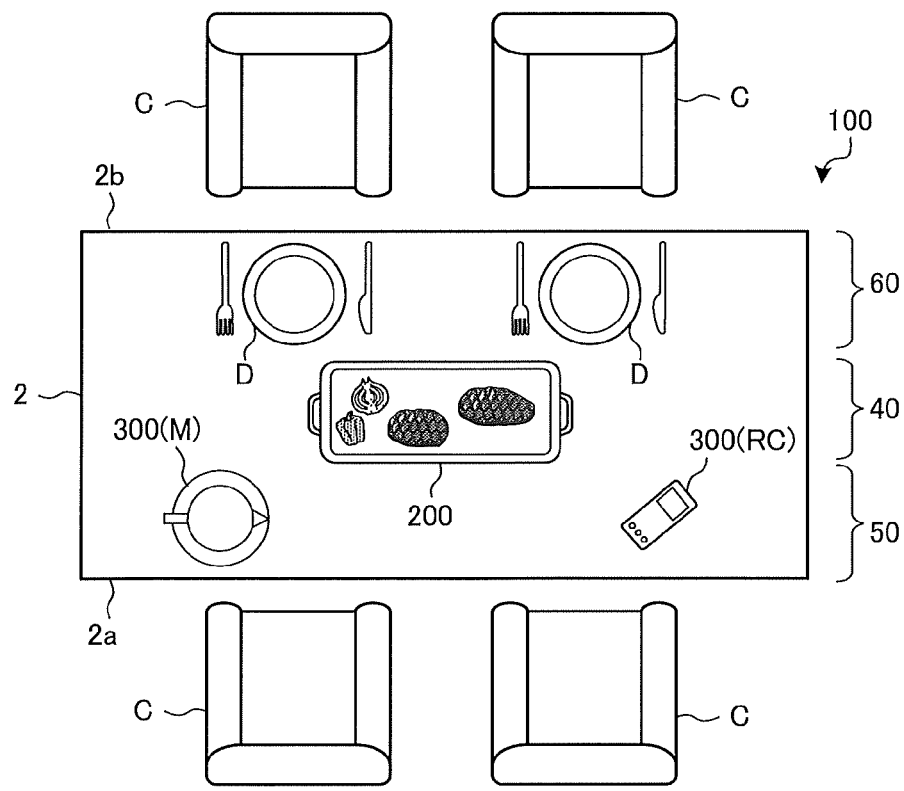
FIG. 4 is a plan view illustrating a used state of the table type cooking apparatus according to Embodiment 1 of the present disclosure.

FIG. 4 is a plan view illustrating a used state of the table type cooking apparatus according to Embodiment 1 of the present disclosure.

As illustrated in FIG. 4, chairs C on which users sit are arranged on the floor and close to the first side 2a and the second side 2b of the top plate 2 of the table type cooking apparatus 100. The table type cooking apparatus 100 is used as a table. The user places the object 200, such as a frying pan, on the heating area 40 of the top plate 2. The user also places a mixer M and a remote control unit RC, which are examples of the power receiving device 300, on the power transmission area 50 of the top plate 2. The user further places metallic forks and knives, which are examples of metal objects, and also dishes D on the work area 60 on the top plate 2.

Next, the user performs an operation for starting heating (application of heating power) using the operation display unit 23. The controller 20 controls the drive circuit 21 according to set power (heating power). The drive circuit 21 supplies a high-frequency current having, for example, approximately 20 to 100 kHz, to the heating coil 11. When the high-frequency current flows in the heating coil 11, a high-frequency magnetic field is produced and an eddy current flows in the bottom of the object 200 in a direction where the eddy current cancels a change of a magnetic flux. Because of the loss of the flowing eddy current, the object 200 is heated.

The heating area 40 of the top plate 2 is provided between the first side 2a and the second side 2b of the top plate 2. Thus, the user can reach the object 200 placed on the heating area 40 of the top plate 2 from two sides of the top plate 2, that is, from the first side 2a and the second side 2b.

The user also performs an operation for starting power transmission to the power receiving device 300 using the operation display unit 23. The controller 20 operates the power transmission circuit 22 to start the supply of power to the power transmission coil 12. As a result, power is supplied from the power transmission coil 12 to the power receiving coil 31 of the power receiving device 300 by electromagnetic induction or electromagnetic resonance. The power received by the power receiving coil 31 is supplied from the power receiving circuit 32 to the power-receiving-side control unit 30 and the load circuit 33.

As precooking, the user crushes and mixes food materials using the mixer M, which is an example of the power receiving device 300. That is, on the top plate 2, in parallel with heating cooking using the object 200, cooking work such as precooking using the power receiving device 300 can be performed. It should be noted that when the power receiving device 300 is a heating cooker such as a roaster, heating cooking by the power receiving device 300 can be performed in parallel with heating cooking using the object 200. Furthermore, the user can operate the table type cooking apparatus 100 using the remote control unit RC, which is an example of the power receiving device 300.

The work area 60 of the top plate 2 is an area in which when the heating coil 11 and the power transmission coil 12 are in a conductive state, a surface potential of a metal object placed on the work area 60 is constant. That is, the metal object placed on the work area 60 is not inductively heated. The user dishes food cooked by the object 200 or the power receiving device 300, on a dish D placed on the work area 60 of the top plate 2, and eats the food using a folk and a knife, which are examples of the metal object. Furthermore, the user places a cutting board on the work area 60 of the top plate 2 and performs cooking works such as cutting of a food material with a kitchen knife, which is an example of the metal object. That is, on the top plate 2, in parallel with heating cooking by the object 200 and cooking by the power receiving device 300, the user can perform cooking works and eat food on the work area 60.

As described above, in Embodiment 1, the top plate 2 includes the heating area 40, the power transmission area 50, and the work area 60. The heating area 40 is an area in which the object 200 placed on the top plate 2 is inductively heated by the heating coil 11. The power transmission area 50 is an area in which power is transmitted from the power transmission coil 12 to the power receiving device 300 placed on the top plate 2. The work area 60 is an area including at least an area in which when at least one of the heating coil 11 and the power transmission coil 12 is in a conductive state, a surface potential of a metal object placed on the top plate 2 is constant.

Therefore, induction heating cooking in the heating area 40, power transmission to the power receiving device 300 in the power transmission area 50, and cooking work in the work area 60 can be performed simultaneously on the upper surface of the top plate 2, and as a result, the convenience of cooking can be improved.

Furthermore, in Embodiment 1, the heating coils 11 are provided between the first side 2a and the second side 2b of the top plate 2, and the power transmission coils 12 are provided between the first side 2a and the heating coils 11. The work area 60 of the top plate 2 is provided between the second side 2b and the heating coils 11.

Therefore, the user can reach the object 200 placed on the heating area 40 of the top plate 2 from two sides of the top plate 2, that is, from the first side 2a and from the second side 2b. In addition, the user can easily reach the power transmission area 50 of the top plate 2 from the first side 2a of the top plate 2 and the work area 60 of the top plate 2 from the second side 2b of the top plate 2.

On the top plate 2, the heating area 40 and the power transmission area 50 are distinguished from each other, thereby preventing the user from easily placing the power receiving device 300 on the heating area 40 by mistake. Thus, the power receiving device 300 can be prevented from being inductively heated by the heating coil 11 by mistake.

It should be noted that in the power transmission by electromagnetic induction, when the heating coil 11 and the power transmission coil 12 are driven at the same time, an interference noise corresponding to the difference between the driving frequencies for those driving operations may be made. In order to reduce such an interference noise, the controller 20 may set the frequency of a high-frequency current to be supplied from the power transmission circuit 22 to the power transmission coil 12 to a frequency that is higher, by an audible frequency or higher (approximately 20 kHz or higher), than the frequency of a high-frequency current to be supplied from the drive circuit 21 to the heating coil 11.

For example, when the driving frequency of the drive circuit 21 of the heating coil 11 is changed within a predetermined range, the lowest driving frequency of the power transmission circuit 22 of the power transmission coil 12 is set higher than the highest driving frequency of the drive circuit 21 of the heating coil 11 by 20 kHz. It should be noted that the range of the driving frequency of the drive circuit 21 of the heating coil 11 is 20 to 40 kHz, for example. In this case, the driving frequency of the power transmission circuit 22 of the power transmission coil 12 is set to fall with the range of 60 to 100 kHz. As a result, an interference noise, which is made when the heating coil 11 and the power transmission coil 12 are driven at the same time, can be reduced.

(Modification)

The controller 20 may switch the area located above the power transmission coils 12 between the power transmission area 50 and the work area 60, by switching the state of the power transmission circuit 22 between an operating state and a stopped state of the power transmission circuit 22, that is, by either operating or stopping the power transmission circuit 22. To be more specific, when the power transmission circuit 22 is in the off state; that is, in the stopped state, the area located above the power transmission coils 12 is used as an area in which the surface potential of a metal object placed on the top plate 2 is kept constant, and as a result, the work area 60 is provided. In other words, the controller 20 stops the operation of the power transmission circuit 22 to stop the supply of power to the power transmission coils 12, whereby the work area 60 is provided above the power transmission coils 12. In addition, the controller 20 operates the power transmission circuit 22 to supply power to the power transmission coil 12, whereby the power transmission area 50 is provided above the power transmission coils 12.

Because of the above, the area located above the power transmission coils 12 can be switched between the power transmission area 50 and the work area 60, and the convenience of cooking can thus be improved.

It should be noted that the controller 20 may switch the state of the power transmission circuit 22 between the operating state and stopped state of the power transmission circuit 22 in response to an input from the operation display unit 23. For example, when an operation instruction to switch the area located above the power transmission coils 12 to the work area 60 is input from the operation display unit 23, the controller 20 stops the operation of the power transmission circuit 22, and nullifies subsequent input operations for starting power transmission. In addition, when an operation instruction to switch the area located above the power transmission coils 12 to the power transmission area 50 is input from the operation display unit 23, the controller 20 cancels the nullification of the input operations for starting power transmission, and operates the power transmission circuit 22 when an input operation for starting power transmission is performed.

By virtue of the above structure, even when the user inputs an operation instruction for starting power transmission by mistake, the power transmission circuit 22 will not be operated and the area located above the power transmission coils 12 is kept as the work area 60.

Embodiment 2

A configuration of a table type cooking apparatus 100 of Embodiment 2 will be described by referring mainly to the differences between Embodiments 1 and 2. It should be noted that regarding Embodiment 2, components that are the same as those in Embodiment 1 described above will be denoted by the same reference signs, and their descriptions will thus be omitted.

(Configuration)

Figure 5:
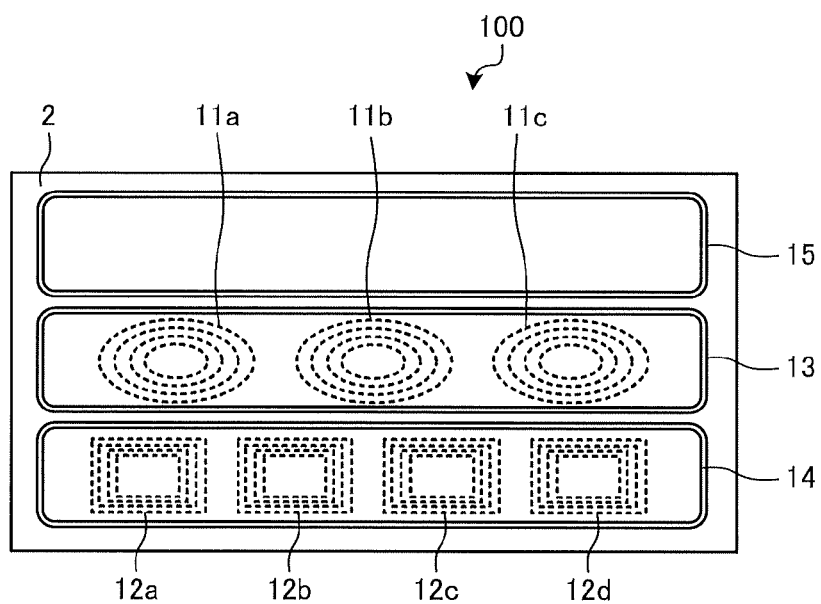
FIG. 5 is a plan view illustrating a table type cooking apparatus according to Embodiment 2 of the present disclosure.

FIG. 5 is a plan view illustrating a table type cooking apparatus according to Embodiment 2 of the present disclosure.

As illustrated in FIG. 5, the table type cooking apparatus 100 includes an indicating unit 13 that indicates the heating area 40 on the top plate 2 in such a manner as to distinguish the heating area 40 from the other areas, an indicating unit 14 that indicates the power transmission area 50 on the top plate 2 in such a manner as to distinguish the power transmission area 50 from the other areas, and an indicating unit 15 that indicates the work area 60 on the top plate 2 in such a manner as to distinguish the work area 60 from the other areas.

The indicating units 13 to 15 are made of, for example, light emitting elements such as LEDs arranged below the top plate 2. The indicating units 13 to 15 are arranged in such a manner as to surround outer edges of the respective areas. The top plate 2 is made of material that allows visible light to pass through the material. The top plate 2 allows light from an LED, which is an example of each of the indicating units 13 to 15, to pass through the top plate 2 in a direction toward to an upper surface side of the top plate 2. The controller 20 controls indication operations of the indicating units 13 to 15. For example, the controller 20 controls turning off the light of the indicating units 13 to 15 and emission colors of the indicating units 13 to 15.

It should be noted that the indicating units 13 to 15 may be each made to have any configuration as long as they indicate the heating area 40, the power transmission area 50, and the work area 60, respectively, on the top plate 2 such that the heating area 40, the power transmission area 50, and the work area 60 on the top plate 2 can be distinguished from each other. For example, LEDs may be linearly arranged between the heating area 40 and the power transmission area 50, and between the heating area 40 and the work area 60.

(Operations)

Next, operations of the table type cooking apparatus 100 in Embodiment 2 will be described.

Figure 6:
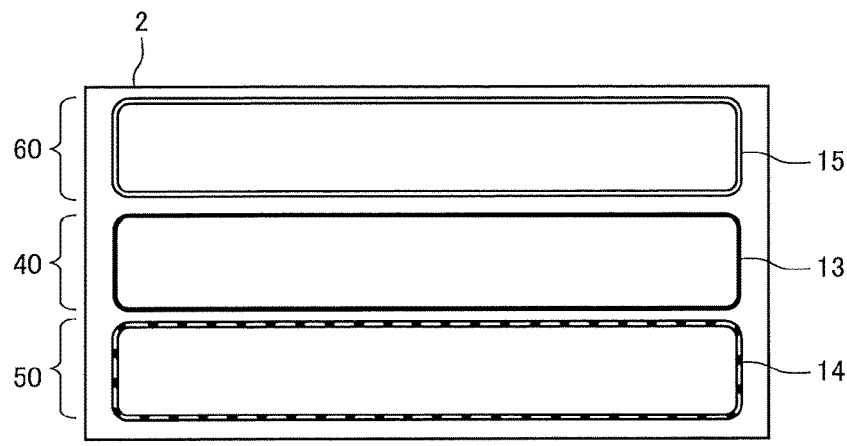
FIG. 6 is a plan view illustrating a displaying state of the table type cooking apparatus according to Embodiment 2 of the present disclosure.

FIG. 6 is a plan view illustrating a displaying state of the table type cooking apparatus according to Embodiment 2 of the present disclosure.

As illustrated in FIG. 6, when the controller 20 starts a heating operation of the heating coil 11, the controller 20 turns on the indicating unit 13 to cause the indicating unit 13 to indicate the heating area 40 in such a manner to distinguish the heating area 40 from the other areas. For example, the controller 20 causes the indicating unit 13 to emit red light. In addition, when the controller 20 starts a power transmission operation of the power transmission coil 12, the controller 20 turns on the indicating unit 14 to cause the indicating unit 14 to indicate the power transmission area 50 in such a manner as to distinguish the power transmission area 50 from the other areas. For example, the controller 20 causes the indicating unit 14 to emit blue light. Furthermore, when the controller 20 starts a heating operation of the heating coil 11 or a power transmission operation of the power transmission coil 12, the controller 20 turns on the indicating unit 15 to cause the indicating unit 15 to indicate the work area 60 in such a manner as to distinguish the work area 60 from the other areas. For example, the controller 20 causes the indicating unit 15 to emit white light.

It should be noted that the timings of the indication operations of the indicating units 13 to 15 are not limited to the above timings. For example, the controller 20 may turn on all the indicating units 13 to 15 at a timing when a main power supply of the table type cooking apparatus 100 is turned on. Also, for example, the controller 20 may turn on the indicating unit 13 when the drive circuit 21 is in a standby state in which the drive circuit 21 is ready to operate, and turn on the indicating unit 14 when the power transmission circuit 22 is in a standby state in which the power transmission circuit 22 is ready to operate.

As described above, in Embodiment 2, because provision of the indicating units 13 to 15, the user can easily recognize the position of each of the above areas on the top plate 2. Therefore, the user can place, for example, the object 200, the power receiving device 300 and dishes D at appropriate positions on the top plate 2. In addition, because of the indicating units 13 to 15, it is possible to prevent the user from easily placing by mistake the power receiving device 300 on the heating area 40. Thus, the power receiving device 300 can be prevented from being inductively heated by the heating coil 11 by mistake.

It should be noted that the indicating unit 15 that indicates the work area 60 in such a manner as to distinguish the work area 60 from the other areas may be omitted. Even in such a configuration, the user can recognize, as the work area 60, the area other than the areas indicated by the indicating unit 13 and the indicating unit 14.

It should be noted that the indicating units 13 to 15 may be made to have any configuration as long as they can indicate the respective areas such that the areas can be distinguished from each other. For example, the indicating units 13 to 15 may be respective colors, characters or signs printed on the top plate 2. Also, for example, the indicating units 13 to 15 may be each a concavity or a convexity formed at the surface of the top plate 2.

(Modification)

Figure 7:
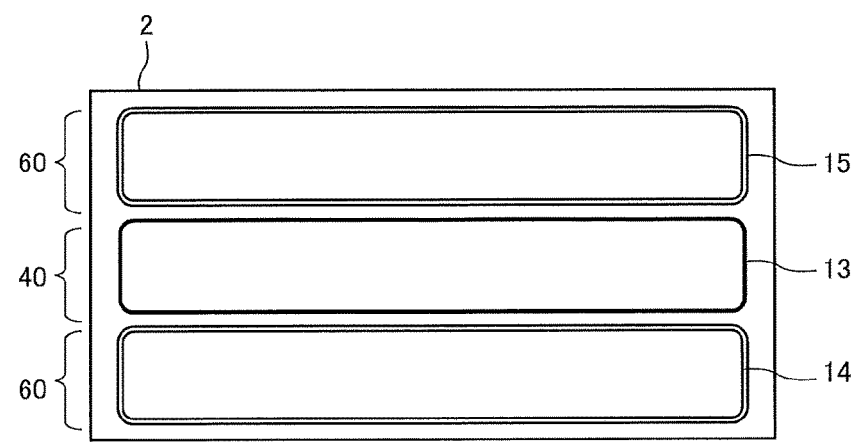
FIG. 7 is a plan view illustrating a displaying state of a modification of the table type cooking apparatus according to Embodiment 2 of the present disclosure.

FIG. 7 is a plan view illustrating a displaying state of a modification of the table type cooking apparatus according to Embodiment 2 of the present disclosure.

As illustrated in FIG. 7, when the operation of the power transmission circuit 22 is in the stopped state, the controller 20 may cause the indicating unit 14 to indicate the work area 60 in such a manner as to distinguish the work area 60 from the other areas. For example, when the operation of the power transmission circuit 22 is in the stopped state and the power transmission from the power transmission coil 12 is in the stopped state, the controller 20 causes the indicating units 14 and 15 to emit white light.

By virtue of the above structure, when the area located above the power transmission coils 12 is switched to either the power transmission area 50 or the work area 60, the user can recognize which of the power transmission area 50 or the work area 60 is provided as the area located above the power transmission coils 12.

Embodiment 3

A configuration of a table type cooking apparatus 100 of Embodiment 3 will be described by referring mainly to the differences between Embodiment 3 and Embodiment 1 or 2. It should be noted that regarding Embodiment 3, components that are the same as those in those of Embodiments 1 and/or 2 will be denoted by the same reference signs, and their descriptions will thus be omitted.

(Configuration)

Figure 8:
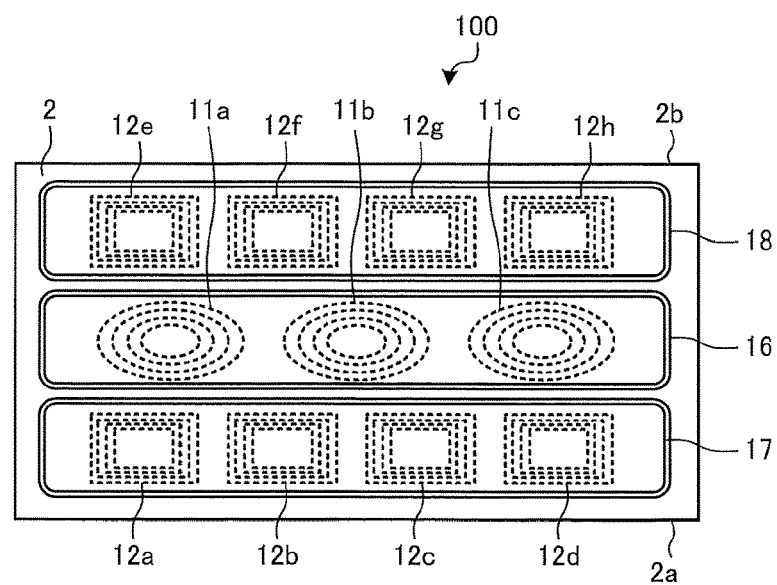
FIG. 8 is a plan view illustrating a table type cooking apparatus according to Embodiment 3 of the present disclosure.

FIG. 8 is a plan view illustrating a table type cooking apparatus according to Embodiment 3 of the present disclosure.

Figure 9:
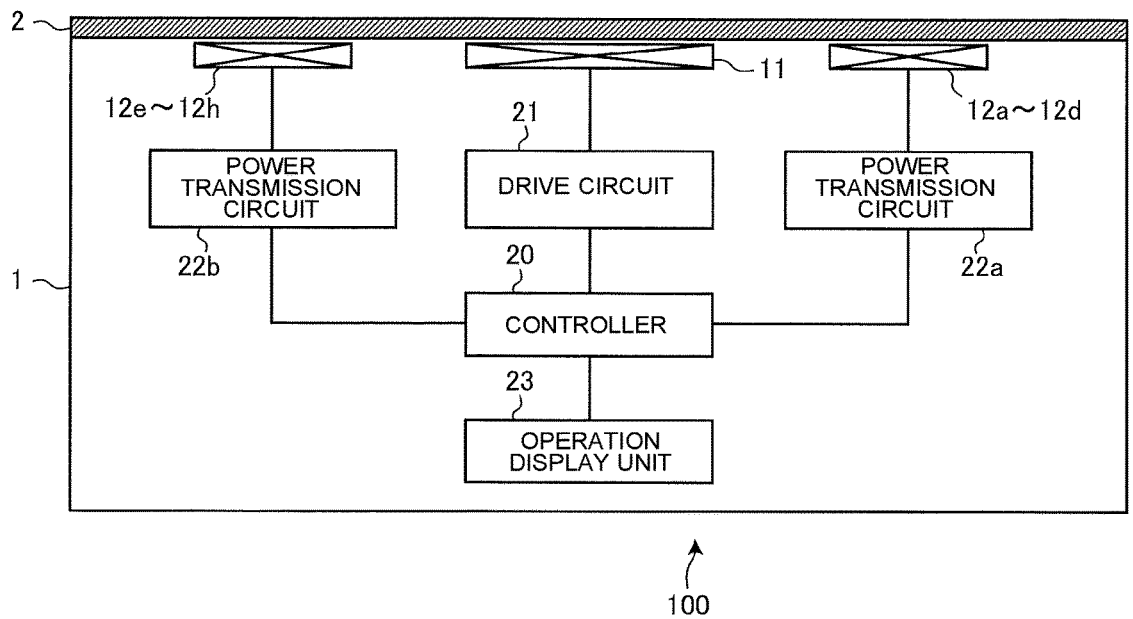
FIG. 9 is a block diagram illustrating a configuration of the table type cooking apparatus according to Embodiment 3 of the present disclosure.

FIG. 9 is a block diagram illustrating a configuration of the table type cooking apparatus according to Embodiment 3 of the present disclosure.

As illustrated in FIGS. 8 and 9, in the housing 1 of the table type cooking apparatus 100, a power transmission coil 12e, a power transmission coil 12f, a power transmission coil 12g, and a power transmission coil 12h are housed. The power transmission coils 12e to 12h are provided between the second side 2b of the top plate 2 and the heating coils 11a to 11c and arranged along the second side 2b, as viewed in plan view.

The power transmission coils 12e to 12h are formed by winding conductive wire made of metal and covered with an insulation film. It should be noted that the conductive wire is made of an arbitrary metal such as copper or aluminum. The power transmission coils 12e to 12h may be printing patterns made of copper foil. In the following description, the power transmission coils 12e to 12h are referred to as power transmission coils 12 in the case where the power transmission coils 12e to 12h do not need to be distinguished from each other. It should be noted that the number of the power transmission coils 12 provided between the second side 2b and the heating coils 11a to 11c is not limited to four, and may be one or more.

The table type cooking apparatus 100 includes a plurality of power transmission circuits 22. For example, the table type cooking apparatus 100 includes a power transmission circuit 22a that supplies high-frequency current to the power transmission coils 12a to 12d and a power transmission circuit 22b that supplies high-frequency current to the power transmission coils 12e to 12h. The controller 20 controls each of the plurality of power transmission circuits 22. It should be noted that the number of the power transmission circuits 22 is not limited to two. Power transmission circuits 22 may be provided such that for a single power transmission coil 12, a single power transmission circuit 22 is provided, or for two power transmission coils 12, a single power transmission circuit 22 is provided.

The table type cooking apparatus 100 includes an indicating unit 16, an indicating unit 17, and indicating unit 18. The indicating unit 16 indicates an area in which the heating coils 11 are provided under the top plate 2 in such a manner as to distinguish the area from the other areas. The indicating unit 17 indicates an area which the power transmission coils 12a to 12d are provided under the top plate 2 in such a manner as to distinguish the area from the other areas. The indicating unit 18 indicates an area in which the power transmission coils 12e to 12h are provided below the top plate 2 in such a manner as to distinguish the area from the other areas.

The indicating units 16 to 18 are made of, for example, light emitting elements such as LEDs provided under the top plate 2. The indicating units 16 to 18 are provided in such a manner as to surround outer edges of the respective areas, for example. The top plate 2 is made of material that allows visible light to pass through the material. The top plate 2 allows light from an LED, which is an example of each of the indicating units 16 to 18, to pass through the top plate 2 in a direction toward an upper surface of the top plate 2. The controller 20 controls indication operations of the indicating units 16 to 18. For example, the controller 20 controls turning on/off the light of the indicating units 16 to 18 and emission color of the indicating units 16 to 18.

(Operations)

Figure 10:
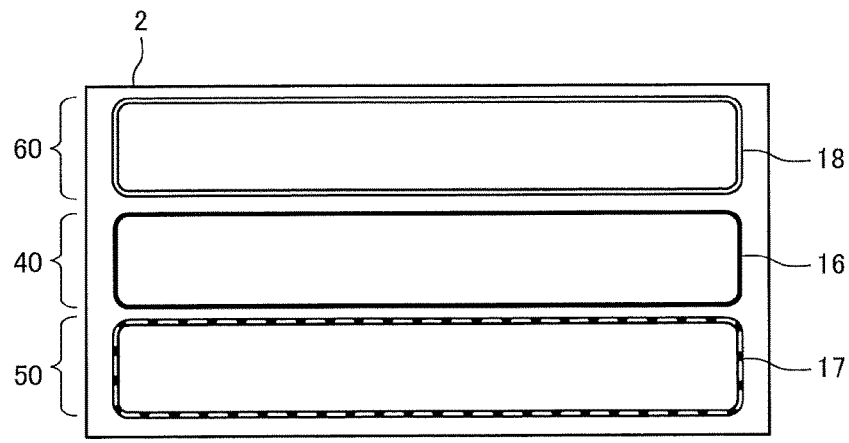
FIG. 10 is a plan view illustrating the table type cooking apparatus according to Embodiment 3 of the present disclosure.
Figure 11:
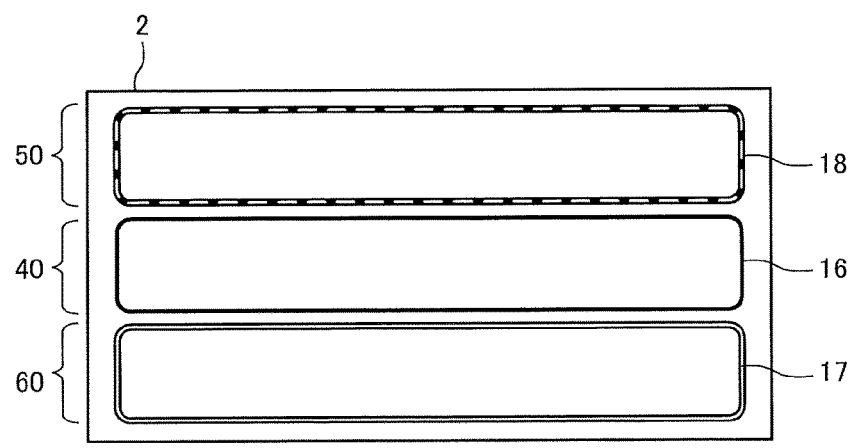
FIG. 11 is another plan view illustrating the table type cooking apparatus according to Embodiment 3 of the present disclosure.
Figure 12:
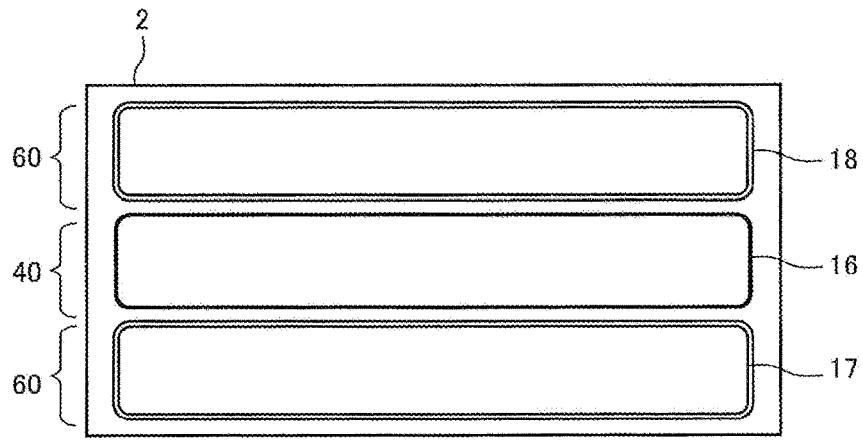
FIG. 12 is a further plan view illustrating the table type cooking apparatus according to Embodiment 3 of the present disclosure.

FIGS. 10 to 12 are plan views illustrating the table type cooking apparatus according to Embodiment 3 of the present disclosure. Operations of the table type cooking apparatus 100 of Embodiment 3 will be described with reference to FIGS. 10 to 12.

The controller 20 switches the state of each of the power transmission circuits 22 to operate or stop each power transmission circuit 22 in response to an input from the operation display unit 23. For example, when an operation for switching the area located above the power transmission coils 12e to 12h to the work area 60 is input from the operation display unit 23, the controller 20 stops the operation of the power transmission circuit 22b, and nullifies subsequent input operations for starting power transmission of the power transmission circuit 22b. As a result, the work area 60 is provided above the power transmission coils 12e to 12h that are not supplied with power. Furthermore, when an operation for starting power transmission to the power receiving device 300 is input from the operation display unit 23, the controller 20 operates the power transmission circuit 22a and provides the power transmission area 50 above the power transmission coils 12a to 12b that are supplied with power.

As illustrated in FIG. 10, the controller 20 turns on the indicating unit 17 to cause the indicating unit 17 to distinguishably indicate the power transmission area 50 at the area located above the power transmission coils 12a to 12b that are supplied with power. For example, the controller 20 causes the indicating unit 17 to emit blue light. Furthermore, the controller 20 turns on the indicating unit 18 to cause the indicating unit 18 to distinguishably indicate the work area 60 at the area located above the power transmission coils 12e to 12h that are not supplied with power since the supply of power to the power transmission coils 12e to 12h is stopped. For example, the controller 20 causes the indicating unit 18 to emit white light. Furthermore, the controller 20 turns on the indicating unit 16 to cause the indicating unit 16 to distinguishably indicate the heating area 40 at the area located above the heating coils 11a to 11c. For example, the controller 20 causes the indicating unit 16 to emit red light.

When an operation for switching the area located above the power transmission coils 12a to 12d to the work area 60 is input from the operation display unit 23, the controller 20 stops the operation of the power transmission circuit 22a, and nullifies subsequent input operations for starting power transmission of the power transmission circuit 22a. As a result, the work area 60 is provided above the power transmission coils 12a to 12d that are not supplied with power since the supply of power to the power transmission coils 12a to 12d is stopped. Furthermore, when an operation for starting power transmission to the power receiving device 300 is input from the operation display unit 23, the controller 20 operates the power transmission circuit 22b to provide the power transmission area 50 above the power transmission coils 12e to 12h that are supplied with power.

As illustrated in FIG. 11, the controller 20 turns on the indicating unit 17 to cause the indicating unit 17 to distinguishably indicate the work area 60 at the area located above the power transmission coils 12a to 12d that are not supplied with power since the supply of power to the power transmission coils 12a to 12d is stopped. For example, the controller 20 causes the indicating unit 17 to emit white light. Furthermore, the controller 20 turns on the indicating unit 18 to cause the indicating unit 18 to distinguishably indicate the power transmission area 50 at the area located above the power transmission coils 12e to 12h that are supplied with power. For example, the controller 20 causes the indicating unit 18 to emit blue light. In addition, the controller 20 turns on the indicating unit 16 to cause the indicating unit 16 to distinguishably indicate the heating area 40 at the area located above the heating coils 11a to 11c. For example, the controller 20 causes the indicating unit 16 to emit red light.

When an operation for switching the area located above the power transmission coils 12a to 12d and the area located above the power transmission coils 12e to 12h to the work areas 60 is input from the operation display unit 23, the controller 20 stops operations of both the power transmission circuits 22a and 22b, and nullifies the subsequent input operations for starting power transmission of the power transmission circuits 22a and 22b. As a result, the work areas 60 are provided above the power transmission coils 12a to 12d and the power transmission coils 12e to 12h that are not supplied with power.

As illustrated in FIG. 12, the controller 20 turns on the indicating units 17 and 18 to cause the indicating units 17 and 18 to distinguishably indicate the work areas 60 at the areas located above the power transmission coils 12a to 12d and the power transmission coils 12e to 12h that are not supplied with power since the supply of power to the power transmission coils 12a to 12d and the power transmission coils 12e to 12h is stopped. For example, the controller 20 causes the indicating units 17 and 18 to emit white light. Furthermore, the controller 20 turns on the indicating unit 16 to cause the indicating unit 16 to distinguishably indicate the heating area 40 at the area located above the heating coils 11a to 11c. For example, the controller 20 causes the indicating unit 16 to emit red light.

As described above, in Embodiment 3, the controller 20 switches the state of each of the power transmission circuits 22 between the operating state and the stopped state. The controller 20 provides the work area 60 above ones of the power transmission coils 12 that are not supplied with power since the supply of power to those power transmission coils 12 is stopped, and provides the power transmission area 50 above ones of the power transmission coils 12 that are supplied with power.

Therefore, the areas located above the plurality of power transmission coils 12 can be switched to the power transmission area 50 and the work area 60, and as a result, the convenience of cooking can be improved.

In addition, in Embodiment 3, the controller 20 switches the state of each of the power transmission circuits 22 between the operating state and the stopped state in response to an input from the operation display unit 23.

Therefore, each of the areas above the power transmission coils 12 can be arbitrarily switched between the power transmission area 50 and the work area 60 in response to an instruction from the user.

Furthermore, in Embodiment 3, the indicating units 16 to 18 are provided. With them, the controller 20 causes the work area 60 to be distinguishably indicated at the area located above ones of the plurality of power transmission coils 12 that are not supplied with power since the supply of power to those power transmission coils is stopped, and causes the power transmission area 50 to be distinguishably indicated at the area located above ones of the plurality of power transmission coils 12 that are supplied with power.

Therefore, the user can easily recognize the position of each of the areas on the top plate 2. Thus, the user can place the object 200, the power receiving device 300, and dishes D at appropriate positions on the top plate 2.

(Modification)

In the case where the power receiving coil 31 of the power receiving device 300 is configured to receive power by electromagnetic induction, when the power receiving device 300 is placed above a heating coil 11, power may be transmitted from the heating coil 11 to the power receiving coil 31. In such a case, the user places the power receiving device 300 on the heating area 40 of the table type cooking apparatus 100. The user performs an operation for starting power transmission to the power receiving device 300 on the heating area 40. The controller 20 drives the drive circuit 21 at a predetermined driving frequency to cause power to be transmitted from the heating coil 11 to the power receiving coil 31.

It should be noted that an operation option in which power transmission is performed at the heating area 40 may be included in an operation menu on the operation display unit 23, or the heating coil 11 may be driven using an operation switch for starting heating.

It should be noted that in an operation of transmitting power from the heating coil 11 to the power receiving coil 31, it is preferable that an output protection operation to prevent an excess output of the power receiving coil 31 be performed. An example of such an operation will be explained with reference to FIG. 13.

Figure 13:
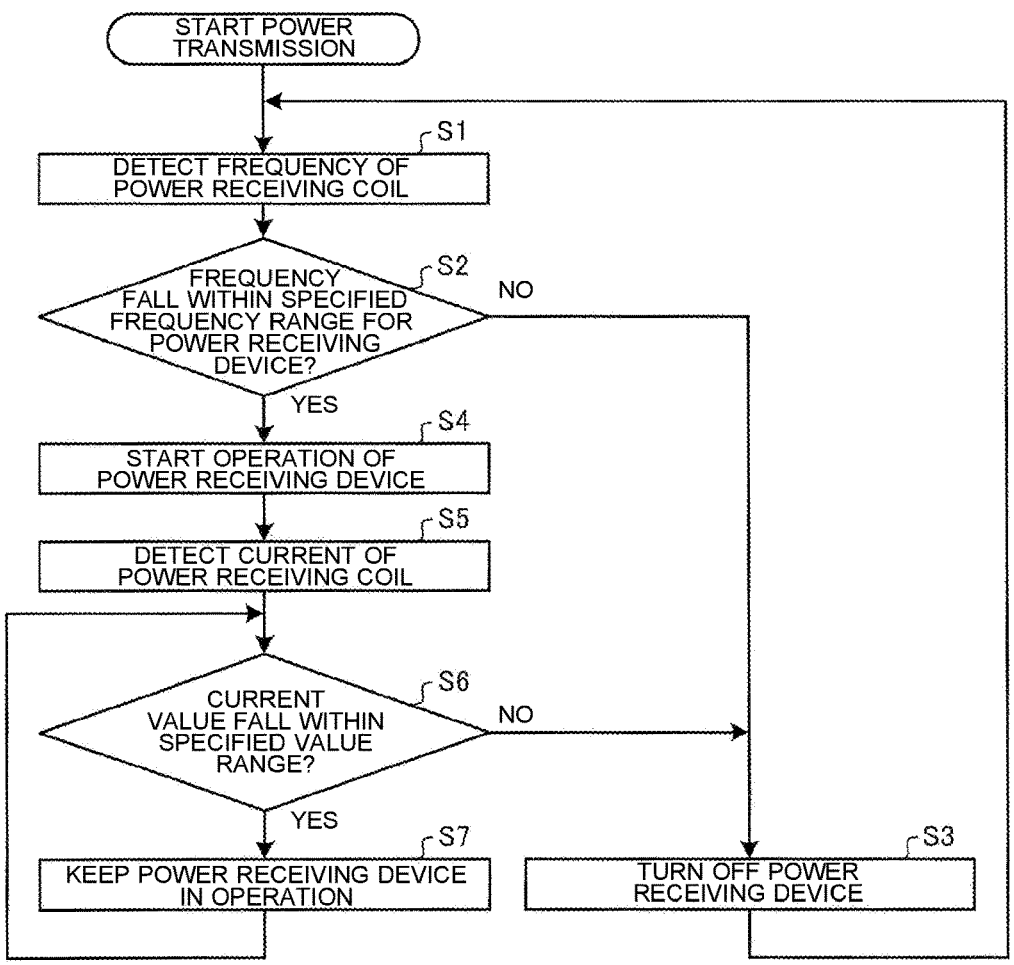
FIG. 13 is a flowchart illustrating operations of a modification of the table type cooking apparatus according to Embodiment 3 of the present disclosure.

FIG. 13 is a flowchart indicating operations of a modification of the table type cooking apparatus according to Embodiment 3 of the present disclosure.

When power transmission from the heating coil 11 to the power receiving coil 31 is started, the power-receiving-side control unit 30 of the power receiving device 300 acquires the result of detection by a current sensor, which is provided to detect a high-frequency current generated in the power receiving coil 31. From the detected result of the current sensor, the power-receiving-side control unit 30 detects a frequency of the high-frequency current received by the power receiving coil 31 (step S1).

The power-receiving-side control unit 30 determines whether or not the frequency of the high-frequency current received by the power receiving coil 31 falls within a specified frequency range for the power receiving device (step S2). For example, the specified frequency range for the power receiving device is set to a frequency range of 60 to 100 kHz.

When the frequency of the high-frequency current received by the power receiving coil 31 does not fall within the specified frequency range for the power receiving device, the power-receiving-side control unit 30 turns off the power receiving device 300 (step S3). Then, the process returns to step S1 and the operations described above are repeated.

By contrast, when the frequency of the high-frequency current received by the power receiving coil 31 falls within the specified frequency range for the power receiving device, the power-receiving-side control unit 30 starts an operation of the power receiving device 300 (step S4). Next, the power-receiving-side control unit 30 acquires the result of detection by the current sensor (step S5), and determines whether or not the current value falls within a specified value range (step S6).

When the current value falls within the specified value range, the power-receiving-side control unit 30 keeps the power receiving device 300 in operation (step S7). Then, the process returns to step S6 and the operations described above are repeated. By contrast, when the current value does not fall within the specified value range, the power-receiving-side control unit 30 turns off the power receiving device 300 (step S3). Then the process returns to step S1 and the operations described above are repeated.

Because of the operations described above, the operation of the power receiving device 300 is performed when the frequency of the high-frequency current received by the power receiving coil 31 falls within the specified frequency range and the current value of the high-frequency current received by the power receiving coil 31 falls within the specified value range.

Therefore, when the power receiving device 300 is placed on the heating area 40 and power is transmitted from the heating coil 11 to the power receiving coil 31, an excess output of the power receiving coil 31 can be prevented.

Embodiment 4

A configuration of a table type cooking apparatus 100 according to Embodiment 4 will be described by referring manly to the differences between Embodiment 4 and Embodiments 1 to 3. It should be noted that regarding Embodiment 4, components that are the same as those in any of Embodiments 1 to 3 will be denoted by the same reference signs, and their descriptions will thus be omitted.

The table type cooking apparatus 100 according to Embodiment 4 includes first power transmission coils provided between one or more of the plurality of heating coils 11 and the first side 2a, and second power transmission coils arranged between a remaining one or more of the heating coils 11 and the second side 2b. A specific example will be explained with reference to FIG. 14.

Figure 14:
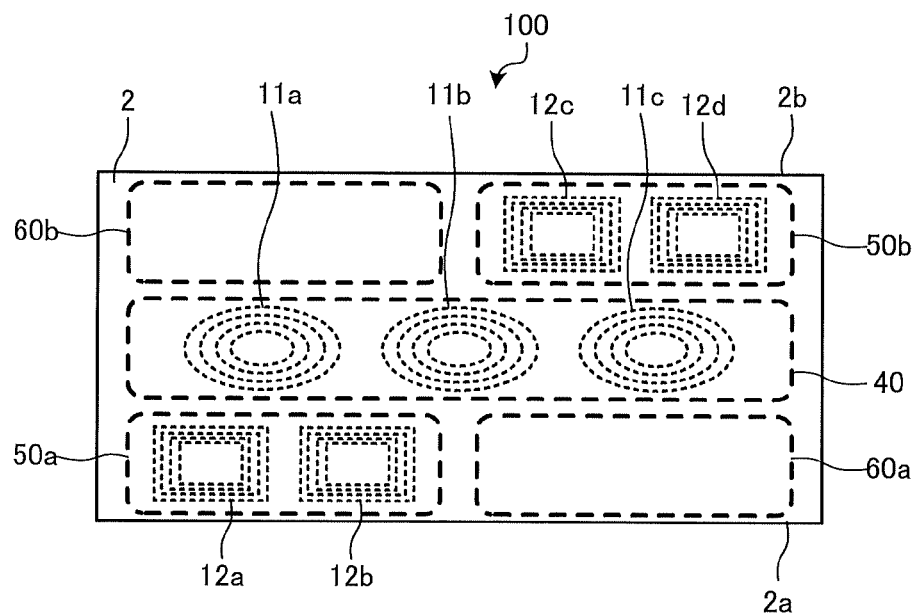
FIG. 14 is a plan view illustrating a table type cooking apparatus according to Embodiment 4 of the present disclosure.

FIG. 14 is a plan view illustrating a table type cooking apparatus according to Embodiment 4 of the present disclosure.

As illustrated in FIG. 14, the heating coils 11a to 11c are provided between the first side 2a and the second side 2b of the top plate 2 and arranged along the first side 2a and the second side 2b, as viewed in plan view.

The power transmission coils 12a and 12b, which are examples of the first power transmission coils, are provided between the first side 2a of the top plate 2 and the heating coil 11a and arranged along the first side 2a, as viewed in plan view. The power transmission coils 12c and 12d, which are examples of the second power transmission coil, are provided between the second side 2b of the top plate 2 and the heating coil 11c and arranged along the second side 2b, as viewed in plan view.

Because of such a configuration, a first power transmission area 50a is provided above the power transmission coils 12a and 12b, and a second power transmission area 50b is provided above the power transmission coils 12c and 12d. In addition, a first work area 60a is provided between the heating coil 11c and the first side 2a, and a second work area 60b is provided between the heating coil 11a and the second side 2b. That is, adjacent to the first side 2a of the top plate 2, the first power transmission area 50a and the first work area 60a are arranged side by side along the first side 2a. In addition, adjacent to the second side 2b of the top plate 2, the second power transmission area 50b and the second work area 60b are arranged side by side along the second side 2b.

As described above, in Embodiment 4, the power transmission areas 50 and the work areas 60 are provided adjacent to the first side 2a and the second side 2b of the top plate 2.

Therefore, from each of the first side 2a and the second side 2b of the top plate 2, the user can easily reach an associated one of the power transmission areas 50 and an associated one of the work areas 60 of the top plate 2.

Furthermore, the sizes and the number of power transmission coils 12 provided for each of the power transmission areas adjacent to the first side 2a and the second side 2b of the top plate 2, the power transmission coils 12 are smaller than in the above configuration of Embodiment 3. Therefore, the manufacturing cost of the table type cooking apparatus 100 can be reduced, as compared with the configuration of Embodiment 3 described above.

Embodiment 5

A configuration of a table type cooking apparatus 100 of Embodiment 5 will be described by referring mainly to the differences between Embodiment 5 and Embodiments 1 to 4. It should be noted that in Embodiment 5, components that are the same as those in any of Embodiments 1 to 4 will be denoted by the same reference signs, and their descriptions will thus be omitted.

In the table type cooking apparatus 100 according to Embodiment 5, the heating coil 11 is located at the center of the top plate 2 and a plurality of the power transmission coils 12 are arranged around the heating coil 11. The work area 60 of the top plate 2 is provided between the plurality of power transmission coils 12 and the sides of the top plate 2. A specific example will be explained with reference to FIG. 15.

Figure 15:
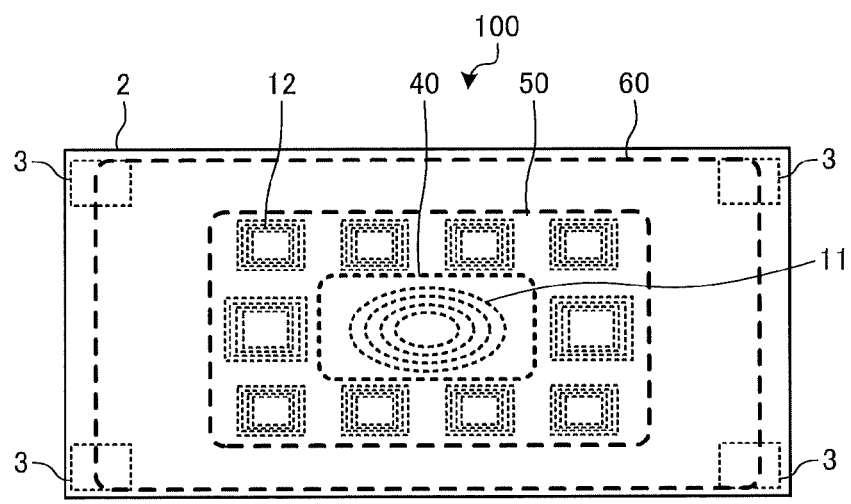
FIG. 15 is a plan view illustrating a table type cooking apparatus according to Embodiment 5 of the present disclosure.

FIG. 15 is a plan view illustrating the table type cooking apparatus according to Embodiment 5 of the present disclosure.

As illustrated in FIG. 15, the top plate 2 is formed in a rectangular shape as viewed in plan view. One heating coil 11 is provided at the center of the top plate 2. The plurality of power transmission coils 12 are arranged around the heating coil 11 and along the sides of the top plate 2. Because of such a configuration, the heating area 40 is provided at the center of the top plate 2, the power transmission area 50 is provided around the heating area 40, and the work area 60 is provided between the power transmission area 50 and the sides of the top plate 2.

Furthermore, the leg portions 3 are provided under the housing 1 at respective four corners of the top plate 2. The leg portions 3 are configured to support the housing 1 such that spaces are provided between the housing 1 and the floor surface in respective regions under the sides of the top plate 2. Chairs or similar furniture, on which users can sit, are set on the floor surface below the sides of the top plate 2. That is, the users use the table type cooking apparatus 100 as a table while sitting on the chairs on the respective four sides of the top plate 2.

As described above, in Embodiment 5, the top plate 2 is formed in a rectangular shape as viewed in plan view, the heating coil 11 is provided at the center of the top plate 2, and the plurality of power transmission coils 12 are arranged around the heating coil 11.

Therefore, the users can easily reach each of the heating area 40, the power transmission area 50 and the work area 60 of the top plate 2 from the respective four sides of the top plate 2. Thus, this configuration enables the users to evenly reach each of the areas, while being sitting around the top plate 2. Furthermore, the users can use each area at the same time, and as a result, the convenience can be improved.

It should be noted that the leg portions 3 may be provided to support the housing 1 such that spaces are provided between the housing 1 and the floor surface in respective regions below at least three of the four sides of the top plate 2. For example, the table type cooking apparatus 100 may be set such that one of the sides of the top plate 2 adjoins a wall surface, and users may sit on the remaining three sides of the top plate 2.

(Modification)

Figure 16:
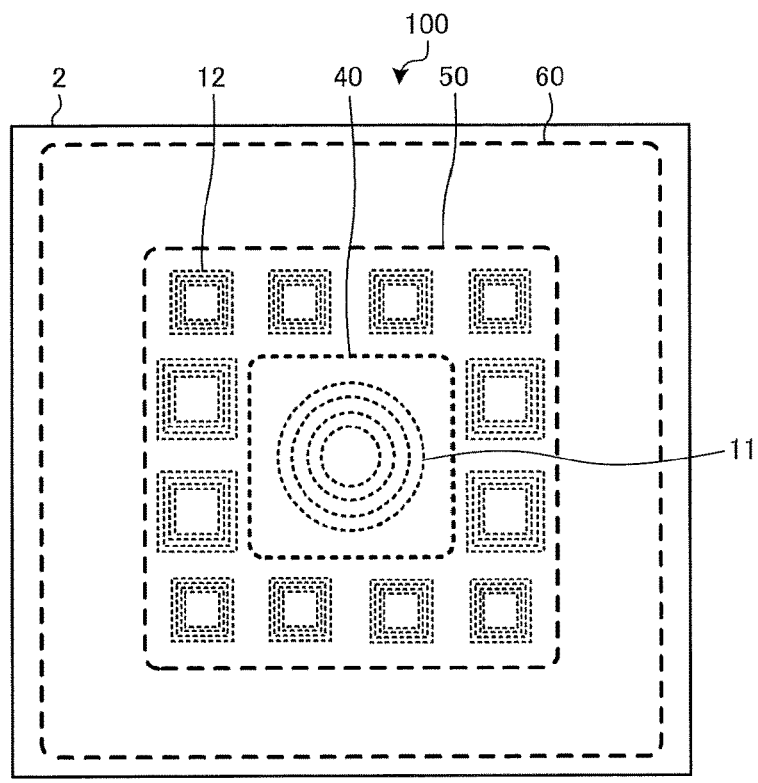
FIG. 16 is a plan view illustrating modification 1 of the table type cooking apparatus according to Embodiment 5 of the present disclosure.

FIG. 16 is a plan view illustrating modification 1 of the table type cooking apparatus according to Embodiment 5 of the present disclosure.

As illustrated in FIG. 16, the top plate 2 is formed in a square shape as viewed in plan view. A single heating coil 11 is provided at the center of the top plate 2. A plurality of power transmission coils 12 are arranged around the heating coil 11 and along the sides of the top plate 2.

Because of such a configuration, the distances from the four sides of the top plate 2 to each area can be made nearly equal to each other.

(Modification 2)

Figure 17:
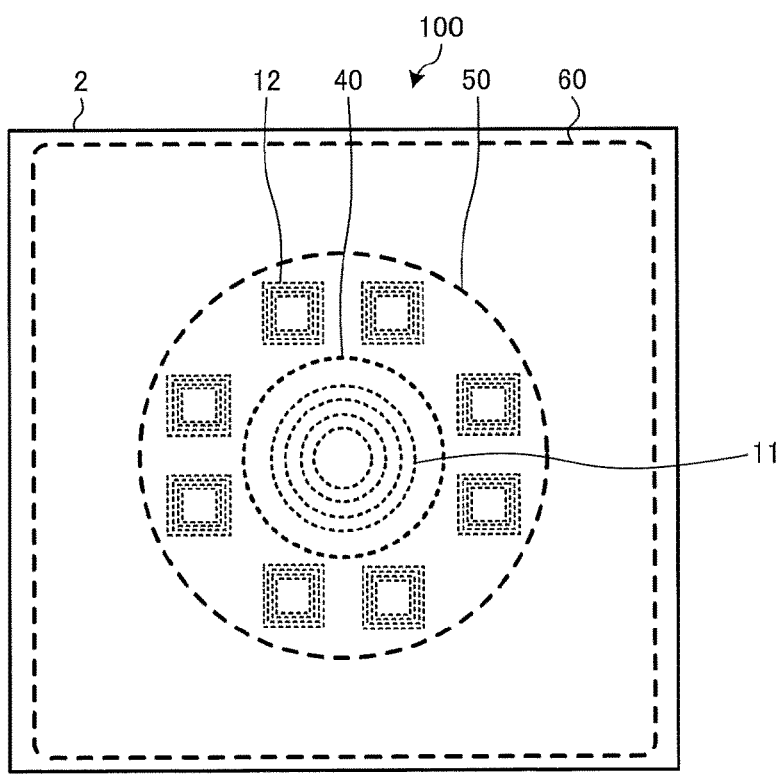
FIG. 17 is a plan view illustrating modification 2 of the table type cooking apparatus according to Embodiment 5 of the present disclosure.

FIG. 17 is a plan view illustrating modification 2 of the table type cooking apparatus according to Embodiment 5 of the present disclosure.

As illustrated in FIG. 17, the top plate 2 is formed in a square shape as viewed in plan view. A single heating coil 11 is provided at the center of the top plate 2. A plurality of power transmission coils 12 are arranged along concentric circles around the heating coil 11.

In such a configuration also, the distances from the four sides of the top plate 2 to each area can be made nearly equal to each other.

(Modification 3)

Figure 18:
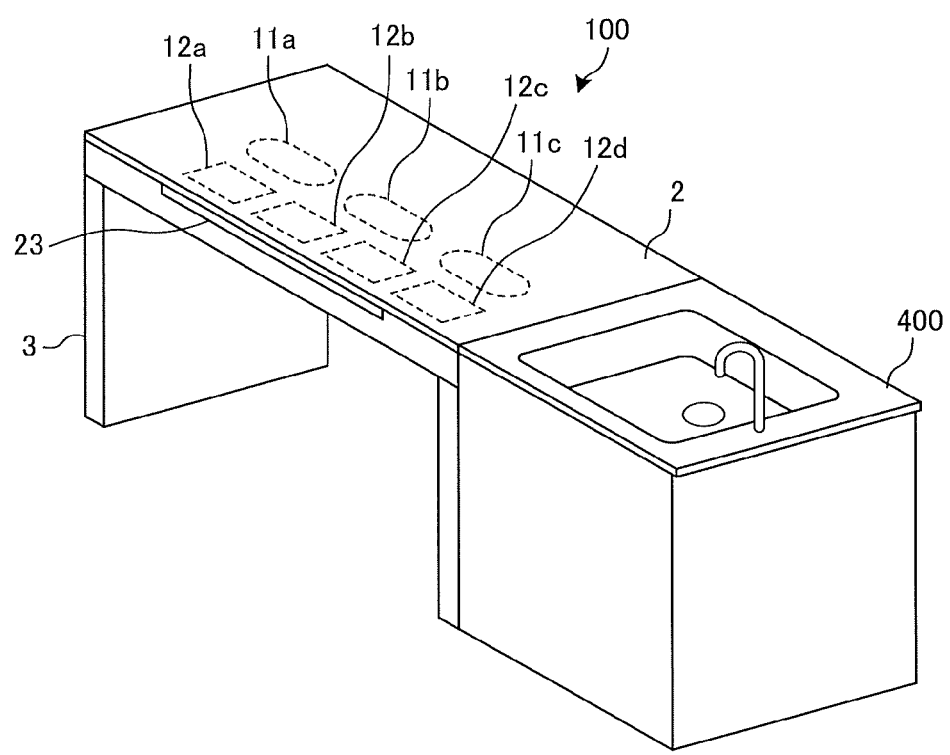
FIG. 18 is a perspective view illustrating modification 3 of the table type cooking apparatus according to Embodiment 5 of the present disclosure.

FIG. 18 is a perspective view illustrating modification 3 of the table type cooking apparatus according to Embodiment 5 of the present disclosure.

As illustrated in FIG. 18, the table type cooking apparatus 100 may be set such that one of the sides of the top plate 2 is located adjacent to a sink 400. It should be noted that the configuration of the table type cooking apparatus 100 is the same as that of any of Embodiments 1 to 5.

In such a configuration, users may sit to face each other on opposite sides of the top plate 2, or users may sit on the respective three sides of the top plate 2.

REFERENCE SIGNS LIST 1 housing 2 top plate 2a first side 2b second side 3 leg portion 11 heating coil 11a heating coil 11b heating coil 11c heating coil 12 power transmission coil 12a power transmission coil 12b power transmission coil 12c power transmission coil 12d power transmission coil 12e power transmission coil 12f power transmission coil 12g power transmission coil 12h power transmission coil 13 indicating unit 14 indicating unit 15 indicating unit 16 indicating unit 17 indicating unit 18 indicating unit 20 controller 21 drive circuit 22 power transmission circuit 22a power transmission circuit 22b power transmission circuit 23 operation display unit 30 power-receiving-side control unit 31 power receiving coil 32 power receiving circuit 33 load circuit 34 power-receiving-side operation unit 40 heating area 50 power transmission area 50a first power transmission area 50b second power transmission area 60 work area 60a first work area 60b second work area 100 table type cooking apparatus 200 heating target 300 power receiving device 400 sink

The invention claimed is:
1. A table type cooking apparatus comprising:
a heating coil configured to inductively heat an object to be heated;

a power transmission coil configured to transmit power to a power receiving device;
a housing housing the heating coil and the power transmission coil;
a top plate provided on an upper surface of the housing;
a leg portion configured to support the housing, on a floor surface;
a power transmission circuit configured to supply power to the power transmission coil;
a controller configured to control the power transmission circuit; and
an operation unit configured to allow a user to input an operation instruction to the operation unit,
the top plate including
a heating area provided as an area in which the object is inductively heated by the heating coil,
a power transmission area provided as an area in which power is transmitted from the power transmission coil to the power receiving device, and
a work area including at least an area in which when at least one of the heating coil and the power transmission coil is in a conductive state, a surface potential of a metal object is constant,
the controller being configured to
in response an operation instruction to switch the area located above the power transmission coil to the work area being input from the operation unit, stop the operation of the power transmission circuit to provide the work area above the power transmission coil, and nullify subsequent input operations from the operation unit to start power transmission to the power transmission coil,
in response to an operation instruction to switch the area located above the power transmission coil to the power transmission area being input from the operation unit, cancel the nullification of the input operations from the operation unit to start power transmission to the power transmission coil, and
in response to the input operation to start power transmission to the power transmission coil being input from the operation unit operate the power transmission circuit to provide the power transmission area above the power transmission coil.

2. The table type cooking apparatus of claim 1, further comprising an indicating unit configured to distinguishably indicate each of the heating area, the power transmission area, and the work area of the top plate.

3. The table type cooking apparatus of claim 1, further comprising:
a plurality of the power transmission coils; and
a plurality of the power transmission circuits configured to supply power to the plurality of power transmission coil,
wherein the controller is configured to switch a state of each of the power transmission circuits between an operating state and a stopped state, to provide the work area above one or more of the plurality of power transmission coils that are not supplied with power, and to provide the power transmission area above one or more of the plurality of power transmission coils that are supplied with power.

4. The table type cooking apparatus of claim 3,
wherein the controller is configured to switch the state of each of the power transmission circuits between the operating state and the stopped state in response to an input from the operation unit.

5. The table type cooking apparatus of claim 3, further comprising an indicating unit configured to distinguishably indicate each of the heating area, the power transmission area and the work area of the top plate,
wherein the indicating unit distinguishably indicates the work area at an area located above the one or ones of the plurality of power transmission coils that are not supplied with power, and distinguishably indicates the power transmission area at an area located above the one or ones of the plurality of the power transmission coils that are supplied with power.

6. The table type cooking apparatus of claim 1, wherein
the heating coil is provided at a center of the top plate,
a plurality of the power transmission coils are arranged around the heating coil, and
the work area of the top plate is provided between the plurality of power transmission coils and sides of the top plate.

7. The table type cooking apparatus of claim 6, wherein a plurality of the power transmission coils are arranged along sides of the top plate.

8. The table type cooking apparatus of claim 6, wherein a plurality of the power transmission coils are arranged along concentric circles around the heating coil.

9. The table type cooking apparatus of claim 6, wherein the leg portion is configured to support the housing, with spaces provided between a lower surface of the housing and the floor surface on at least three sides of the top plate.

10. The table type cooking apparatus of claim 1, wherein
the top plate is formed in a rectangular shape as viewed in plan view and has a first side and a second side on opposite sides,
the heating coil is provided between the first side and the second side,
the power transmission coil is provided between the first side and the heating coil, and
the work area of the top plate is provided between the second side and the heating coil.

11. A table type cooking apparatus, comprising:
a heating coil configured to inductively heat an object to be heated;
a power transmission coil configured to transmit power to a power receiving device;
a housing housing the heating coil and the power transmission coil;
a top plate provided on an upper surface of the housing; and
a leg portion configured to support the housing, on a floor surface,
the top plate including
a heating area provided as an area in which the object is inductively heated by the heating coil,
a power transmission area provided as an area in which power is transmitted from the power transmission coil to the power receiving device, and
a work area including at least an area in which when at least one of the heating coil and the power transmission coil is in a conductive state, a surface potential of a metal object is constant, wherein
a plurality of the heating coils are provided between the first side and the second side and arranged along the first side and the second side,
a plurality of the power transmission coils include a first power transmission coil provided between one or more of the plurality of heating coils and the first side, and a second power transmission coil provided between a remaining one or more of the plurality of heating coils and the second side, and the work area of the top plate includes a first work area provided between the remaining one or more of the plurality of heating coils and the first side, and a second work area formed between the one or more of the plurality of heating coils and the second side.

12. The table type cooking apparatus of claim 11, wherein the leg portion is configured to support the housing, with a space provided between an under surface of the housing and the floor surface on at least one of the first side and the second side.

\* \* \* \* \*